UNITED STATES PATENT OFFICE.

JOSEPH C. W. FRAZER, OF BALTIMORE, MARYLAND, AND CHARLES C. SCALIONE, OF WASHINGTON, DISTRICT OF COLUMBIA.

CATALYST AND PROCESS OF MAKING IT.

1,345,323.　　　　Specification of Letters Patent.　　Patented June 29, 1920.

No Drawing.　　Application filed February 4, 1919.　Serial No. 275,007.

*To all whom it may concern:*

Be it known that we, JOSEPH C. W. FRAZER and CHARLES C. SCALIONE, citizens of the United States, and residing at Baltimore, Maryland, and Washington, District of Columbia, respectively, have invented certain new and useful Improvements in Catalysts and Processes of Making Them, of which the following is a specification.

The improvements herein described relate to catalysts which are capable of causing oxidizing reactions and to processes of oxidation wherein such catalysts are used.

In carrying out oxidizing reactions by the agency of heretofore known catalysts, it has been necessary to conduct the catalysis at elevated temperatures, and in many cases the temperature necessary to cause the oxidation to take place was in the neighborhood of red heat (say 600° C.). This high temperature was needed because of the comparatively low activity of the catalytic material, and, because of this necessity for high temperatures to increase the rate of oxidation, many such reactions could not efficiently and economically be carried out.

One of the objects of the present invention, therefore, is the production of catalysts which are more active than those ordinarily used and capable of causing oxidation of oxidizable gases and vapors at temperatures greatly below those hitherto considered necessary, for example, capable of causing some such oxidations at ordinary or "room" temperature and below.

Another object of the invention is a process of oxidation using the present catalysts whereby the full efficiency of the catalysts is retained.

Broadly stated, therefore, the invention is in the production of highly active oxidizing catalysts capable of causing oxidizing catalysis at low temperatures, and in the catalysts themselves. These catalysts for the want of a better term have been named "hopcalite."

Briefly, the catalysts herein described and claimed are composed of metal oxids or basic sulfates, acetates or carbonates of the more common metals singly or in admixture, which compounds have been prepared in an extremely fine state of subdivision, collected and dried at a low temperature.

Among the metals whose oxids, basic carbonates, basic acetates, and basic sulfates that we have found useful for the present purposes when properly prepared, are manganese, cobalt, copper, iron, nickel, bismuth, lead, and silver. And it may be stated as a general rule that mixtures of two or more of the above mentioned compounds are more active than single compounds. Further, these single compounds or mixtures may be made somewhat more active by the addition of a small percentage of certain finely divided metals, particularly metals of the platinum group.

In preparing the catalysts according to the present invention, it is essential, first, that the compounds be prepared in an extremely finely divided or semi-colloidal condition, *i. e.*, the particles approaching the colloidal, if they are not actually so, in size, and, second, when the product is composed of mixtures, the constituents must be intimately mixed and, third, that the compounds be carefully dried at low temperature. If the drying is carried out at high temperature, the structure of the product is so modified that the activity is greatly decreased, and in many instances entirely destroyed.

The following specific examples illustrate some of the preferred methods of preparing the new catalysts, but it is to be understood that the invention is not to be limited to the specific disclosures therein.

EXAMPLE I.

*Preparation of single oxids.*

(*a*) To a three or four per cent. solution of permanganic acid is gradually added a solution of oxalic acid, the quantity being calculated to be just sufficient to reduce the permanganic acid to manganese dioxid. The whole is kept cool, below 25° C. After standing, the manganese dioxid is filtered by suction. If there is found in the filtrate any excess of either reagent, the manganese dioxid is washed free of this, finally filtered and left as a paste. This paste may then be dried at or below 200° C., or it may be used as indicated hereinafter.

Another method of preparing manganese dioxid is as follows: To moderately strong sulfuric acid (60 to 80% $H_2SO_4$) add powdered anhydrous manganese sulfate with constant stirring. To the mixture add powdered potassium permanganate in small excess over the theoretical ratio—2 mols KMnO₄ to 3 mols MnSO₄. After a few minutes pour the mixture into a large volume of cold water. Hydrated manganese dioxid is rapidly precipitated. The hydrated oxid is then washed free of sulfate and acid, collected in a filter press and dried at about 200° C. The dried cake is then crushed and screened to size, producing a hard, very porous material.

(b) Copper oxid may be prepared by precipitating directly a concentrated copper salt solution with a slight excess of a concentrated solution of sodium hydroxid or carbonate. The precipitate is washed until free of sulfate (if copper sulfate is used as a starting material) and alkali, collected in a filter press and dried at 120° C.

(c) Cobaltic oxid is prepared by adding to a concentrated solution of a cobaltous salt at room temperature a solution containing sodium hydroxid and hypochlorite until an excess of both are present. The mixture is then allowed to stand for about ½ an hour, during which time much of the excess of hypochlorite is decomposed with evolution of oxygen. The precipitate is then washed until the wash water is free from chlorid and alkali, collected in a filter press and dried at about 200° C.

Example II.

Preparation of mixed oxids.

(a) A product consisting of the mixed oxids of manganese and silver may be made starting with the manganese dioxide paste above described using the following method: An amount of the paste equivalent to 10 grams of dry manganese dioxid is made into a suspension in 600 c. c. of distilled water. Sufficient silver nitrate is added to give 6 grams of silver oxid. Then sodium hydroxid solution is added to slight excess with vigorous stirring, thereby precipitating silver oxid. After settling, the material is washed three times by decantation and filtered by suction. The paste is dried, first, on a water bath, then in an oil bath at 130° C. in a current of dry air or oxygen. The drying is continued until no moisture appears on a cold mirror held in the effluent gas.

(b) A composition composed of a mixture of compounds above mentioned may also be obtained by precipitating simultaneously the several compounds from mixtures of the soluble salts in solution. For instance, the oxids of silver, copper, iron, nickel, cobalt, manganese, and others, or any two or more of them may be precipitated by adding caustic alkali to a mixture of their soluble salts in solution and after washing the precipitate, filtering and drying as above indicated.

(c) Further, suitable mixtures may be made by preparing separately the several constituents in extremely finely divided condition and after intimately mixing, drying at low temperatures as indicated.

In producing mixed products, or products composed of mixtures of the above mentioned compounds, it is essential that they be extremely intimate mixtures. This may be accomplished by a thorough kneading of the paste produced on filtering the material and in those cases where the precipitation of two or more compounds is simultaneous or in the same solution, constant stirring will assist the mixture.

It should be noted that the drying of the pastes should be carried out at such temperatures as will not change materially the physical structure of the particles and should also be continued until all of the occluded moisture and a part of the water of hydration is removed. Suitable temperatures for this drying step have already been indicated in the specific examples but of course will vary with the composition of the material. These temperatures should in all cases not exceed about 225–250° C. at atmospheric pressure. This drying step is essential to the activity of the material at a very low temperature.

When the products are dried in cakes and crushed there will always be a certain amount of fines which can be returned to the process by adding them to the suspended material before filtration and again drying, or these may be wet ground, filtered, and dried to produce a satisfactory catalyst.

In filtering the material preparatory to drying, it is frequently advisable and sometimes necessary to put the filter cake under rather high pressure so that relatively hard granules may be produced. With some of the compounds this is not necessary. However, pressing usually improves the product in that it tends to decrease the distance between the individual particles and thus enables a more intimate contact to be had between the gases to be treated and the catalyzer.

The procedure wherein the material is dried in the form of a cake and subsequently broken up into suitable size will produce porous lumps or granules and this condition is preferred because it allows the passage of gases through a mass more freely than if the product were ground to a powder. So wherever in the claims there occurs the term "agglomerates" or the like, it is these lumps or granules that are referred to.

The products produced by the above process will be found to be active at considerably lower temperatures than those heretofore considered necessary and still greater activity may be produced by carrying out the drying of the oxids or compounds or mixtures in oxygen or gases containing free oxygen, or heating to temperatures from 100 to 200 degrees C. the already dried oxids in such an atmosphere.

It should be noted that, in order that the catalysts may be active at such low temperatures as room temperature and in order that they retain this activity under use, it is necessary that moisture be excluded from the sphere of action. This is accomplished by carefully drying the catalysts until all of the occluded moisture and considerable of the water of hydration has been eliminated and by careful drying of the gases to be treated. However, if this condition is observed, catalysis readily takes place without preliminary heating and will continue even if the catalyst is kept cool.

Catalysts prepared as above may be used to accomplish the oxidation of most of the readily oxidizable gases and vapors, for example, carbon monoxid, ammonia, sulfur dioxid, aldehydes, alcohols, toluene, etc., by passing them mixed with oxygen or air through the catalyst at ordinary or only slightly elevated temperatures.

In those cases where the reaction products tend to deposit in the catalyst, a somewhat higher temperature than room temperature is required in order that the action may continue a reasonably long time, but, even in such cases, catalysis will take place though the activity of the catalyst will decrease.

Further, where the catalyst has been used for such purposes and becomes inactive from the presence of moisture or has absorbed water vapor from the atmosphere, it may be again rendered active by carefully drying it at about the same temperature at which it was originally dried.

While we have in our examples indicated that water is the usual medium in which the suspensions are to be made and that hydrated oxids are used, we do not wish to be limited to these as it is probable that other analogous (e. g. ammoniated) compounds may be used instead of hydrated compounds and that other media may be used in the place of water.

Further it is to be understood that suitable supporting materials may also be used if considered desirable or necessary and such material may readily be included in the composition by adding it in a suitable state of subdivision to the suspended finely divided compound before collection for the purpose of forming the cake and drying. This is a procedure that will be apparent to anyone skilled in the art.

Having now described the invention and the preferred forms of practising the same, it is to be understood, that we do not wish to be limited to these specific details as they may be departed from without departing from the spirit of the invention which is set out in the accompanying claims.

We claim as our invention:

1. The process of producing active oxidizing catalysts which comprises precipitating a hydrated metal oxid in an extremely finely divided condition, washing free of soluble matter, collecting the precipitate, compressing the same into a coherent cake and drying the cake at a low temperature in a current of a free oxygen containing gas.

2. The process of producing active oxidizing catalysts which comprises forming a suspension of a plurality of basic metal compounds in semi-colloidal condition in water, collecting the solid material, kneading and forming into a coherent mass, and drying the mass at a low temperature.

3. The process of producing active oxidizing catalysts which comprises forming a suspension of a plurality of basic metal compounds in semi-colloidal condition in water, collecting the solid material, kneading, forming into a coherent mass and drying the mass at a low temperature in a current of free-oxygen containing gas.

4. The process of producing active oxidizing catalysts which comprises forming a suspension of a plurality of metal oxids in semi-colloidal condition in water, collecting the solid material, kneading, forming into a coherent mass and drying at a low temperature.

5. The process of producing active oxidizing catalysts which comprises forming a suspension of a plurality of metal oxids in semi-colloidal condition in water, collecting the solid material, kneading, forming into a coherent mass and drying the mass at a low temperature in a current of a gas containing free oxygen.

6. The process of producing active oxidizing catalysts which comprises forming a suspension of a semi-colloidal metal oxid in water, precipitating therewith another metal oxid in substantially the same condition of subdivision, collecting the mixed oxids, washing free of soluble impurities, kneading, forming into a coherent mass and drying at a low temperature.

7. The process of producing active oxidizing catalysts which comprises forming a suspension of a semi-colloidal metal oxid in water, precipitating therewith another metal oxid in substantially the same state of subdivision, collecting the mixed oxids, washing free of soluble impurities, kneading, forming into a coherent mass and drying the mass in a current of free oxygen containing gas at a low temperature.

8. The process of producing active oxidizing catalysts which comprises precipitating together two or more hydrated metal oxids in a semi-colloidal condition, washing free of soluble matter, collecting the mixed oxids, kneading, forming into a coherent mass and drying the mass at a low temperature.

9. The process of producing active oxidizing catalysts which comprises precipitating together two or more hydrated metal oxids in a semi-colloidal condition, washing free of soluble matter, collecting the mixed oxids, kneading, forming into a coherent mass and drying the mass at a low temperature in a current of gas containing free oxygen.

10. The process of producing active oxidizing catalysts which comprises forming a suspension of a plurality of basic metal compounds in a semi-colloidal condition in water, collecting the solid material forming into a coherent mass and drying the mass at a low temperature in a current of free-oxygen containing gas.

11. The process of producing active oxidizing catalysts which comprises forming a suspension of a plurality of metal oxids in semi-colloidal condition in water, collecting the solid material, forming into a coherent mass and drying the mass at a low temperature in a current of a gas containing free oxygen.

12. The process of producing active oxidizing catalysts which comprises forming a suspension of a semi-colloidal metal oxid in water, precipitating therewith another metal oxid in substantially the same condition of subdivision, collecting the mixed oxids, washing free of soluble impurities, forming into a coherent mass and drying at a low temperature.

13. The process of producing active oxidizing catalysts which comprises forming a suspension of a semi-colloidal metal oxid in water, precipitating therewith another metal oxid in substantially the same state of subdivision, collecting the mixed oxids, washing free of soluble impurities, forming into a coherent mass and drying the mass in a current of free-oxygen containing gas at a low temperature.

14. The process of producing active oxidizing catalysts which comprises precipitating together two or more hydrated metal oxids in a semi-colloidal condition, washing free of soluble matter, collecting the mixed oxids, forming into a coherent mass and drying the mass at a low temperature in a current of gas containing free oxygen.

15. A catalyst comprising a porous agglomerate of semi-colloidal particles of manganese dioxid, cobaltic oxid and copper oxid.

16. A catalyst comprising a porous agglomerate of semi-colloidal particles of manganese dioxid and cobaltic oxid.

17. A catalyst comprising a porous agglomerate of semi-colloidal particles of manganese dioxid and copper oxid.

18. The process of producing active oxidizing catalysts which comprises precipitating together two or more hydrated metal oxids in a semi-colloidal condition, washing free of soluble matter, collecting the mixed oxids, kneading, forming into a coherent mass and drying the mass at a low temperature and subsequently heating in a current of gas containing free oxygen.

19. The process of producing active oxidizing catalysts which comprises precipitating together two or more hydrated metal oxids in a semi-colloidal condition, washing free of soluble matter, collecting the mixed oxids, forming into a coherent mass and drying the mass at a low temperature and subsequently heating in a current of gas containing free oxygen.

20. The process of producing active oxidizing catalysts which comprises forming a suspension of a plurality of metal oxids in semi-colloidal condition in water, intimately mixing the same, collecting the solid material, kneading, forming into a coherent mass, drying at a low temperature and subsequently heating in an atmosphere of a gas containing free oxygen.

21. The process of producing active oxidizing catalysts which comprises forming a suspension of a plurality of metal oxids in semi-colloidal condition in water, intimately mixing the same, collecting the solid material, forming into a coherent mass, drying at a low temperature and subsequently heating in an atmosphere of a gas containing free oxygen.

22. A catalyst comprising a porous agglomerate of semi-colloidal particles of manganese dioxid, cobaltic oxid and copper oxid and having the structure characteristic of such material when it is dried at low temperatures.

23. A catalyst comprising a porous agglomerate of semi-colloidal particles of manganese dioxid and copper oxid and having the structure characteristic of such material when it is dried at low temperatures.

24. A catalyst comprising a porous agglomerate of semi-colloidal particles of manganese dioxid and a smaller proportion of another metal oxid.

25. A catalyst comprising a porous agglomerate of semi-colloidal particles of manganese dioxid and small proportions of a plurality of other metal oxids.

26. A catalyst comprising a porous agglomerate of semi-colloidal particles of manganese dioxid and a smaller proportion of copper oxid.

27. A catalyst comprising a porous agglomerate of semi-colloidal particles of manganese dioxid and a smaller proportion of cobaltic oxid.

28. A catalyst comprising a porous agglomerate of semi-colloidal particles of manganese dioxid and small proportions of cobaltic oxid and copper oxid.

29. A catalyst comprising an intimate mixture of semi-colloidal particles of manganese dioxid and a smaller amount of another metal oxid.

30. A catalyst comprising an intimate mixture of semi-colloidal particles of manganese dioxid and small proportions of a plurality of other metal oxids.

31. A catalyst comprising an intimate mixture of semi-colloidal particles of manganese dioxid and a smaller amount of copper oxid.

32. A catalyst comprising an intimate mixture of semi-colloidal particles of manganese dioxid and a smaller amount of cobaltic oxid.

33. A catalyst comprising an intimate mixture of semi-colloidal particles of manganese dioxid and small proportions of cobaltic and copper oxid.

34. A catalyst comprising a porous agglomerate of semi-colloidal particles of manganese dioxid and silver oxid.

35. A catalyst comprising a porous agglomerate of semi-colloidal particles of manganese dioxid, silver oxid and copper oxid.

36. A catalyst comprising a porous agglomerate of semi-colloidal particles of manganese dioxid, silver oxid, copper oxid and cobaltic oxid.

37. A catalyst comprising a porous agglomerate of semi-colloidal particles of manganese dioxid and silver oxid and having the structure characteristic of such material when it is dried at low temperatures.

38. A catalyst comprising a porous agglomerate of semi-colloidal particles of manganese dioxid, silver oxid and copper oxid and having the structure characteristic of such material when it is dried at low temperatures.

39. A catalyst comprising a porous agglomerate of semi-colloidal particles of manganese dioxid, silver oxid, copper oxid and cobaltic oxid and having the structure characteristic of such material when it is dried at low temperatures.

40. A catalyst comprising a porous agglomerate of semi-colloidal particles of manganese dioxid and smaller proportions of silver oxid, copper oxid and cobaltic oxid.

41. A catalyst comprising an intimate mixture of semi-colloidal particles of manganese dioxid and small proportions of silver oxid, copper oxid and cobaltic oxid.

JOSEPH C. W. FRAZER.
CHARLES C. SCALIONE.